US010086706B2

(12) United States Patent
Nomura (10) Patent No.: US 10,086,706 B2
(45) Date of Patent: Oct. 2, 2018

(54) VEHICLE

(71) Applicant: Toyota Jidosha Kabushiki Kaisha, Toyota-shi, Aichi-ken (JP)

(72) Inventor: Atsushi Nomura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/456,776

(22) Filed: Mar. 13, 2017

(65) Prior Publication Data

US 2017/0267103 A1 Sep. 21, 2017

(30) Foreign Application Priority Data

Mar. 17, 2016 (JP) ................... 2016-053827

(51) Int. Cl.
*B60L 3/04* (2006.01)
*H02M 7/537* (2006.01)
(Continued)

(52) U.S. Cl.
CPC ............... *B60L 3/04* (2013.01); *B60K 6/22* (2013.01); *B60L 3/003* (2013.01); *H02J 7/0047* (2013.01); *H02J 7/0068* (2013.01); *H02M 7/537* (2013.01); *H02P 21/22* (2016.02); *H02P 27/06* (2013.01); *B60Y 2200/92* (2013.01); *B60Y 2306/13* (2013.01); *B60Y 2306/15* (2013.01); *B60Y 2400/61* (2013.01); *H02J 7/345* (2013.01); *Y10S 903/904* (2013.01)

(58) Field of Classification Search
CPC .. B60L 3/04; B60L 3/003; B60K 6/22; H02M 7/537; H02P 27/06; H02P 21/22; H02J 7/0068; H02J 7/0047

USPC ......................................... 318/139
See application file for complete search history.

(56) References Cited

U.S. PATENT DOCUMENTS

2010/0213904 A1* 8/2010 Yamada ................. B60L 3/003
320/166
2012/0055727 A1 3/2012 Omiya et al.
(Continued)

FOREIGN PATENT DOCUMENTS

JP 2007-244070 A 9/2007
JP 2012-100385 A 5/2012
(Continued)

*Primary Examiner* — Kawing Chan
*Assistant Examiner* — Bradley Brown
(74) *Attorney, Agent, or Firm* — Dinsmore & Shohl LLP (57) ABSTRACT

A vehicle includes: at least one rotary electric machine; an inverter that drives the rotary electric machine; a capacitor connected between a paired electric power lines that is connected to the inverter; and a control unit. When a vehicle collision is detected, the control unit executes first control for discharging electric charges stored in the capacitor by performing a switching operation of the inverter so as to prevent a flow of a q-axis current but cause a flow of a d-axis current to the rotary electric machine. The control unit stops the first control in a specified case and executes second control for performing the switching operation of the inverter so as to reduce the current flowing through the rotary electric machine to be lower than that during execution of the first control. The control unit executes third control for shutting down the inverter after execution of the second control.

13 Claims, 8 Drawing Sheets (51) Int. Cl.
*H02J 7/00* (2006.01)
*B60L 3/00* (2006.01)
*H02P 21/22* (2016.01)
*B60K 6/22* (2007.10)
*H02P 27/06* (2006.01)
*H02J 7/34* (2006.01)

(56) References Cited

U.S. PATENT DOCUMENTS

| | | | |
|---|---|---|---|
| 2012/0212160 A1* | 8/2012 | Shindo | B60L 3/0007 |
| | | | 318/139 |
| 2013/0049665 A1* | 2/2013 | Oyobe | H02P 3/22 |
| | | | 318/489 |
| 2014/0232304 A1* | 8/2014 | Sekiya | H02P 3/18 |
| | | | 318/400.02 |

FOREIGN PATENT DOCUMENTS

| | | |
|---|---|---|
| JP | 2014-192957 A | 10/2014 |
| JP | 2015-019561 A | 1/2015 |
| WO | 2010/131340 A1 | 11/2010 |

\* cited by examiner

VEHICLE

CROSS-REFERENCE TO RELATED APPLICATIONS

This application claims priority to Japanese Patent Application No. 2016-053827 filed on Mar. 17, 2016, the entire contents of which are hereby incorporated by reference.

BACKGROUND

1. Technical Field

The disclosure relates to a technique of discharging residual electric charges of a capacitor when a vehicle including the capacitor that is electrically connected to a rotary electric machine via an inverter is involved in a collision.

2. Description of Related Art

A vehicle that includes: a battery; a boost converter connected to the battery; an inverter connected to the boost converter; a permanent magnet type motor driven by the inverter; a first capacitor connected between paired electric power lines that connect the boost converter and the inverter; and a second capacitor connected between paired electric power lines that connect the boost converter and the battery has been disclosed in Japanese Patent Application Publication No. 2012-100385 (JP 2012-100385 A). When this vehicle collides with a collision target, such as another vehicle or an obstacle, discharge control for discharging residual electric charges of the capacitors is executed by performing a switching operation of the inverter so as to prevent a flow of a q-axis current (a torque current that affects torque) but cause a flow of a d-axis current (a field current that does not affect the torque) to the motor. Then, the inverter is stopped (gate-blocked).

In addition, in view of a fact that the current flows through a motor coil and the electric charges are recirculated in the first capacitor for a while after a stop of the inverter due to electric inertia of the motor coil, the electric charges are distributed not only to the first capacitor but also to the second capacitor by bringing an upper arm of the boost converter into an on state (a conductive state) when the inverter is stopped in the above vehicle. In this way, a boost in an inter-terminal voltage (hereinafter also referred to as a "system voltage") of the first capacitor, which is caused by the recirculated electric charges during the stop of the inverter, is suppressed.

SUMMARY

In the electric charge distribution, which is disclosed in JP 2012-100385 A described above, the recirculated electric charges during the stop of the inverter are merely distributed to the two capacitors. Accordingly, in the case where a large amount of energy is stored in the motor coil, such as a case where the motor rotates during the stop of the inverter, a large number of the electric charges are recirculated from the motor due to the energy stored in the motor coil during the stop of the inverter. Thus, a boost amount of the system voltage after the stop of the inverter may not appropriately be suppressed only by distributing the electric charges as described in JP 2012-100385 A.

The embodiments have been made to solve the above-described problem and therefore has a purpose of appropriately suppressing a boost amount of an inter-terminal voltage of a capacitor at a time when an inverter is stopped after discharge control of the capacitor.

A vehicle according to a first aspect of the disclosure includes: at least one permanent magnet type rotary electric machine; an inverter that drives the rotary electric machine; paired DC electric power lines connected to the inverter; a capacitor connected between the paired DC electric power lines; and a control unit that controls the inverter. The control unit executes first control for discharging electric charges stored in the capacitor by performing a switching operation of the inverter so as to prevent a flow of a q-axis current but cause a flow of a d-axis current to the rotary electric machine in a case where a vehicle collision is detected. The control unit stops the first control in a specified case and executes second control for performing the switching operation of the inverter so as to reduce an absolute value of the current flowing through the rotary electric machine to be lower than that during execution of the first control. The control unit executes third control for switching the inverter into a gate blockage state after execution of the second control.

The specified case may be a case in which a voltage of the capacitor becomes lower. The specified case also may be a case in which a voltage of the capacitor is lower than a specified value. The specified case also may be a case in which a specified time elapses from a start of the first control.

According to the above aspect, the control unit does not switch the inverter into the gate blockage state immediately after the stop of the first control (capacitor discharge control), but executes the second control for performing the switching operation of the inverter so as to reduce the magnitude of the current flowing through the rotary electric machine to be lower than that during the execution of the first control. Then, after executing the second control, the control unit switches the inverter into the gate blockage state. In this way, energy stored in a coil of the rotary electric machine during gate blocking of the inverter is reduced. Thus, a recirculation amount of the electric charges recirculated into the capacitor during the gate blocking of the inverter is reduced. As a result, a boost amount of an inter-terminal voltage of the capacitor at a time when the inverter is stopped (gate-blocked) after the capacitor discharge control can appropriately be suppressed.

A vehicle according to a second aspect of the disclosure includes: a permanent magnet type first rotary electric machine; a first inverter that drives the first rotary electric machine; a permanent magnet type second rotary electric machine; a second inverter that drives the second rotary electric machine; paired DC electric power lines connected to the first inverter and the second inverter; a capacitor connected between the paired DC electric power lines; and a control unit that controls the first inverter and the second inverter. The control unit executes first control for discharging electric charges stored in the capacitor by performing switching operations of the first inverter and the second inverter so as to prevent a flow of a q-axis current but cause a flow of a d-axis current to each of the first rotary electric machine and the second rotary electric machine in a case where a vehicle collision is detected. The control unit stops the first control in a specified case and executes second control for controlling the first inverter and the second inverter so as to reduce a total of absolute values of the currents flowing through the first rotary electric machine and the second rotary electric machine to be lower than that during execution of the first control. The control unit executes third control for controlling the first inverter and the second inverter into gate blockage states after execution of the second control.

The specified case may be a case in which a voltage of the capacitor becomes lower. The specified case also may be a case in which a voltage of the capacitor is lower than a specified value. The specified case also may be a case in which a specified time elapses from a start of the first control.

According to the above aspect, in the vehicle that includes the two rotary electric machines (the first rotary electric machine and the second rotary electric machine) and the two inverters (the first inverter and the second inverter), the control unit does not switch the two inverters into the gate blockage states immediately after the stop of the first control (the capacitor discharge control), but executes the second control for controlling the two inverters so as to reduce the total of the currents flowing through the two rotary electric machines to be lower than that during the execution of the first control. Then, after executing the second control, the control unit controls the two inverters into the gate blockage states. In this way, total energy stored in each coil of the two rotary electric machines at the time when the two inverters are controlled into the gate blockage states is reduced. Thus, a recirculation amount of the electric charges recirculated into the capacitor at the time when the two inverters are controlled into the gate blockage states is reduced. As a result, a boost amount of an inter-terminal voltage of the capacitor at the time when the two inverters are controlled into the gate blockage states after the capacitor discharge control can appropriately be suppressed.

The first control may be a control for performing the switching operations of the first inverter and the second inverter such that a magnitude of the q-axis current of each of the first rotary electric machine and the second rotary electric machine becomes zero, that the magnitude (an absolute value) of the d-axis current of the first rotary electric machine becomes a first specified value that is larger than zero, and that the magnitude (the absolute value) of the d-axis current of the second rotary electric machine becomes a second specified value that is larger than zero. The second control may be a control for performing the switching operation of the first inverter such that the first inverter is brought into the gate blockage state, that the magnitude of the q-axis current of the second rotary electric machine becomes zero, and that the magnitude (the absolute value) of the d-axis current of the second rotary electric machine becomes equal to or smaller than the second specified value. The third control may be control for switching the second inverter into the gate blockage state while maintaining the first inverter in the gate blockage state after the execution of the second control.

According to the above aspect, the control unit switches the first inverter into the gate blockage state prior to the second inverter after the stop of the first control. In this way, the second inverter can be switched into the gate blockage state after the current flowing through the first rotary electric machine is reduced. Thus, compared to a case where the two inverters are concurrently switched into the gate blockage states, the recirculation amount of the electric charges to the capacitor can be reduced without executing complicated control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A detailed description will hereinafter be made on an embodiment of the disclosure with reference to the drawings. Note that the same or corresponding portions in the drawings are denoted by the same reference numerals and a description thereon will not be repeated.

Figure 1:
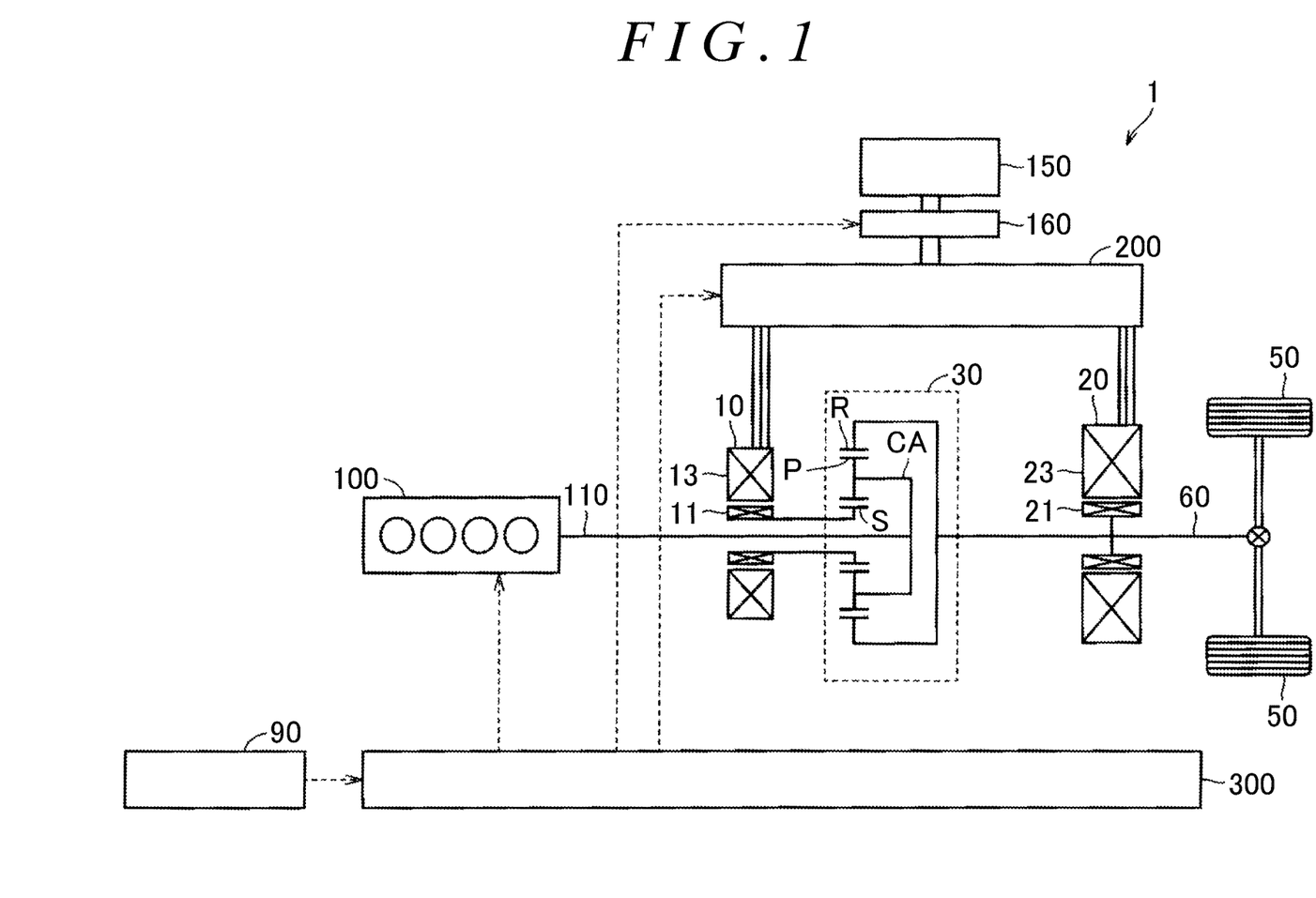
FIG. 1 is a schematic view of an overall configuration of a vehicle.

FIG. 1 is a schematic view of an overall configuration of a vehicle 1 according to this embodiment. The vehicle 1 includes an engine 100, a first motor generator 10 (hereinafter also referred to as a "first MG 10"), a second motor generator 20 (hereinafter also referred to as a "second MG 20"), a planetary gear mechanism 30, drive wheels 50, an output shaft 60 connected to the drive wheels 50, a battery 150, a system main relay (SMR) 160, a power control unit (PCU) 200, and an electronic control unit (ECU) 300. The vehicle 1 further includes a collision detection section 90.

The vehicle 1 is a hybrid vehicle that travels by transmitting at least one of power of the engine 100 and power of the second MG 20 to the drive wheels 50.

The engine 100 is an internal combustion engine such as a gasoline engine or a diesel engine. The engine 100 generates the power for a travel of the vehicle 1 in accordance with a control signal from the ECU 300. The power generated by the engine 100 is output to the planetary gear mechanism 30.

Each of the first MG 10 and the second MG 20 is a permanent magnet type three-phase AC synchronous motor. In the following description, a rotational speed of the first MG 10 will also be described as a "first MG rotational speed Nm1", and a rotational speed of the second MG 20 will also be described as a "second MG rotational speed Nm2".

The first MG 10 includes a rotor 11 and a stator 13. The rotor 11 of the first MG 10 is connected to the engine 100 via the planetary gear mechanism 30. The first MG 10 can generate electric power by using the power of the engine 100. The first MG 10 can also generate torque for cranking the engine 100 by using electric power of the battery 150 when a start request of the engine 100 is made.

The second MG 20 includes a rotor 21 and a stator 23. The rotor 21 of the second MG 20 is coupled to the output shaft 60. The second MG 20 causes rotation of the output shaft 60 by using the electric power that is supplied from at least one of the battery 150 and the first MG 10. The second MG 20 can also generate electric power through regenerative braking.

The planetary gear mechanism 30 mechanically couples the engine 100, the first MG 10, and the output shaft 60. The planetary gear mechanism 30 includes, as rotation elements: a sun gear S coupled to the rotor of the first MG 10; a ring gear R coupled to the output shaft 60; a carrier CA coupled to a crankshaft 110 of the engine 100; and a pinion gear P that meshes with the sun gear S and the ring gear R. The carrier CA holds the pinion gear P so as to allow rotation and revolution of the pinion gear P. The output shaft 60 is connected to the right and left drive wheels 50 via a differential gear and is coupled to the second MG 20 as described above.

Note that FIG. 1 shows the planetary gear mechanism 30 of a single pinion type. However, the planetary gear mechanism 30 is not necessarily limited to the single pinion type but also may be, for example, a double pinion type.

The battery 150 is a rechargeable battery. The battery 150 stores the electric power for driving the first MG 10 and the second MG 20. An output voltage of the battery 150 is a relatively high voltage (for example, about several hundred volts).

The SMR 160 switches between a conductive state and a blockage state between the battery 150 and the PCU 200 in accordance with a control signal from the ECU 300.

The PCU 200 boosts a DC voltage received from the battery 150, converts the boosted voltage to an AC voltage, and supplies the AC voltage to the first MG 10 and the second MG 20. The PCU 200 also converts AC power generated by the first MG 10 and the second MG 20 to DC power and supplies the DC power to the battery 150. A detailed description on a configuration of the PCU 200 will be made by using FIG. 2.

The collision detection section 90 includes a G sensor (an acceleration sensor), for example, detects whether the vehicle 1 collides with a collision target from a detection result of the G sensor, and outputs a signal indicative of the detection result to the ECU 300.

Although not shown, the ECU 300 is configured by including a central processing unit (CPU), a memory, an input/output buffer, and the like. Based on signals from each sensor and equipment as well as on a map and a program stored in the memory, the ECU 300 controls output of the engine 100, the first MG 10, and the second MG 20 so as to achieve a desired travel state of the vehicle 1.

Figure 2:
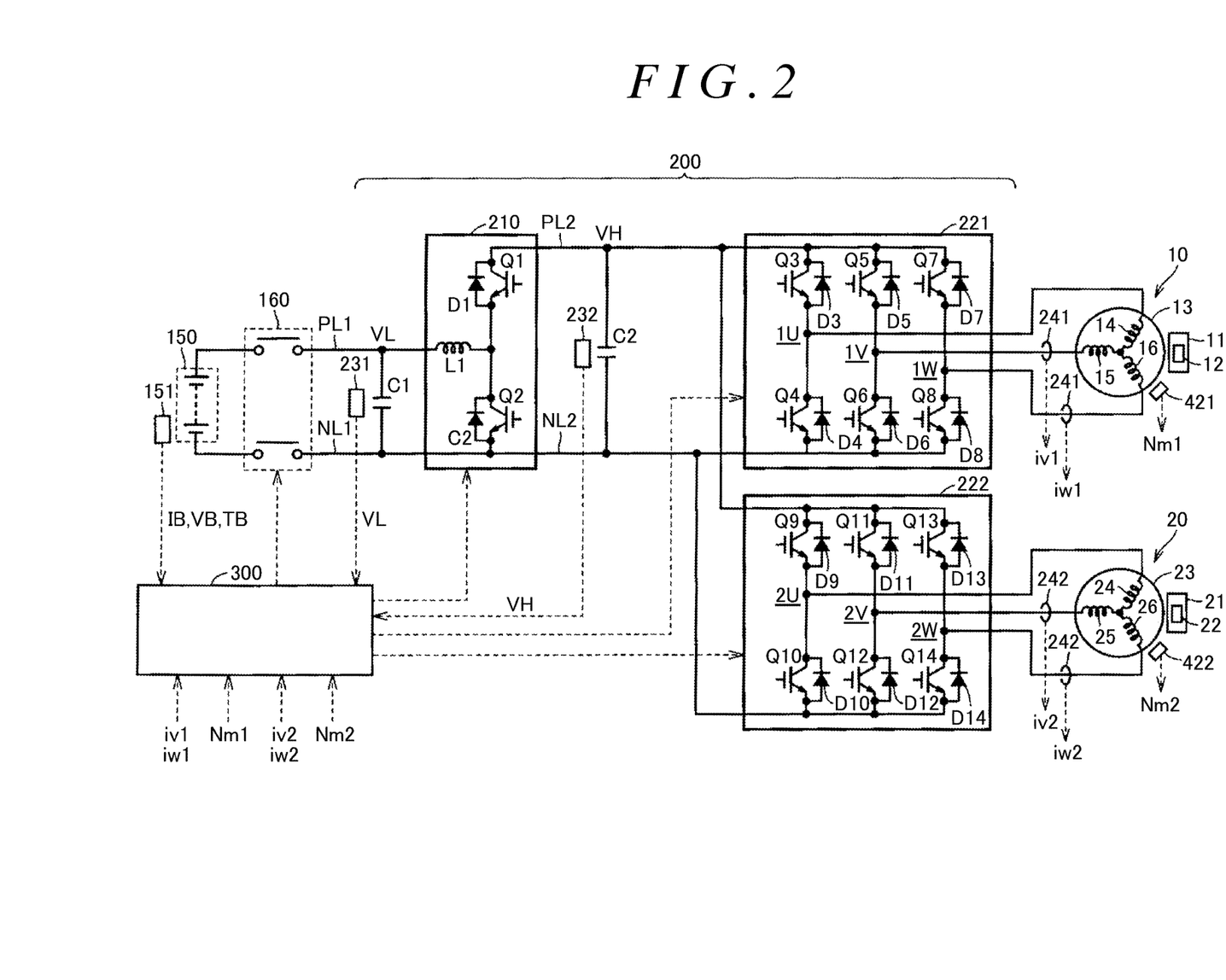
FIG. 2 is a circuit block diagram for explaining a configuration of an electric system of the vehicle.

FIG. 2 is a circuit block diagram for explaining a configuration of an electric system of the vehicle 1. The electric system of the vehicle 1 includes the battery 150, the SMR 160, the PCU 200, the first MG 10, the second MG 20, and the ECU 300. The PCU 200 includes a converter 210, paired electric power lines PL1, NL1 (a positive electrode line PL1, a negative electrode line NL1), paired electric power lines PL2, NL2 (a positive electrode line PL2, a negative electrode line NL2), capacitors C1, C2, a first inverter 221, a second inverter 222, and voltage sensors 231, 232.

The SMR 160 includes: a relay connected between a positive electrode of the battery 150 and the positive electrode line PL1; and a relay connected between a negative electrode of the battery 150 and the negative electrode line NL1. The capacitor C1 is connected between the paired electric power lines PL1, NL1 and smoothes a voltage VL between the paired electric power lines PL1, NL1. The voltage sensor 231 detects a voltage at each end of the capacitor C1, that is, the voltage VL between the paired electric power lines PL1, NL1.

The converter 210 is electrically connected to the paired electric power lines PL1, NL1 and the paired electric power lines PL2, NL2. Note that, because the negative electrode line NL1 and the negative electrode line NL2 are directly coupled, the negative electrode line NL1 and the negative electrode line NL2 have the same electric potential.

The converter 210 includes a reactor L1, a switching element Q1 (an upper arm), a switching element Q2 (a lower arm), and diodes D1, D2. Each of the switching elements Q1, Q2 and switching elements Q3 to Q14, which will be described below, is an insulated gate bipolar transistor (IGBT), for example. The switching elements Q1, Q2 are connected in series between the paired electric power lines PL2, NL2. In a switching operation in accordance with a control signal from the ECU 300, the converter 210 converts a voltage between the paired electric power lines PL2, NL2 and the paired electric power lines PL1, NL1.

The capacitor C2 is connected between the paired electric power lines PL2, NL2 and smoothes a voltage between the paired electric power lines PL2, NL2. The voltage sensor 232 detects a voltage at each end of the capacitor C2, that is, a voltage (hereinafter also referred to as a "system voltage") VH between the paired electric power lines PL2, NL2 and outputs the detection result to the ECU 300.

When being supplied with the system voltage VH, the first inverter 221 converts the DC voltage to the AC voltage and drives the first MG 10. The first inverter 221 includes: the six switching elements Q3 to Q8; and diodes D3 to D8, each of which is connected in reverse-parallel between a collector and an emitter of each of the switching elements Q3 to Q8.

Each of the six switching elements Q3 to Q8 constitutes a three-phase drive arm that has an upper arm and a lower arm. More specifically, the first inverter 221 includes a U-phase arm 1U, a V-phase arm 1V, and a W-phase arm 1W. The U-phase arm 1U has the switching element Q3 (the upper arm) and the switching element Q4 (the lower arm) that are connected in series. The V-phase arm 1V has the switching element Q5 (the upper arm) and the switching element Q6 (the lower arm) that are connected in series. The W-phase arm 1W has the switching element Q7 (the upper arm) and the switching element Q8 (the lower arm) that are connected in series.

The second inverter 222 includes the switching elements Q9 to Q14 and diodes D9 to D14. Note that a configuration of the second inverter 222 is basically the same as a configuration of the first inverter 221, and thus a description will not be made repeatedly.

A permanent magnet 12 is attached to the rotor 11 of the first MG 10. A U-phase coil 14, a V-phase coil 15, and a W-phase coil 16 (hereinafter these coils will each be referred to as a "first MG coil" without being distinguished) are attached to the stator 13 of the first MG 10.

A permanent magnet 22 is attached to the rotor 21 of the second MG 20. A U-phase coil 24, a V-phase coil 25, and a W-phase coil 26 (hereinafter these coils will each be referred to as a "second MG coil" without being distinguished) are attached to the stator 23 of the second MG 20.

The first MG 10 and the second MG 20 are respectively provided with resolvers 421, 422. The resolver 421 detects the first MG rotational speed Nm1 (more specifically, a rotor rotational angle θ1 of the first MG 10). The resolver 422 detects the second MG rotational speed Nm2 (more specifically, a rotor rotational angle θ2 of the second MG 20).

The first MG 10 and the second MG 20 are respectively provided with current sensors 241, 242. The current sensor 241 detects a V-phase current iv1 and a W-phase current iw1 of the first MG 10. Note that a U-phase current iu1 of the first MG 10 is computed from the V-phase current iv1 and the W-phase current iw1 by using a fact that a total of the phase currents of the first MG 10 (=iu1+iv1+iw1) is 0. The current sensor 242 detects a V-phase current iv2 and a W-phase current iw2 of the second MG 20. Note that a U-phase current iu2 of the second MG 20 is computed from the V-phase current iv2 and the W-phase current iw2 by using a fact that a total of the phase currents of the second MG 20 (=iu2+iv2+iw2) is 0.

The battery 150 is provided with a monitoring unit 151. The monitoring unit 151 detects a voltage (a battery voltage) VB of the battery 150, a current (a battery current) IB flowing through the battery 150, and a temperature (a battery temperature) TB of the battery 150.

Based on information and the like from each of the sensors, the ECU 300 controls the PCU 200 (the converter 210, the first inverter 221, and the second inverter 222) so as to make output of the MGs 10, 20 desired output.

The ECU 300 uses a vector control method to execute feedback control of the currents flowing through the first MG 10 and the second MG 20. In general, for the vector control of the motor, a method for controlling a torque current (a q-axis current), which generates torque, and a field current (a d-axis current), which controls intensity of a field without affecting the torque, in an orthogonal vector coordinate system with a d-axis and a q-axis is used. Note that the d-axis is an axis in a direction of magnetic flux generated by the rotor (the permanent magnet) of the motor, and the q-axis is an axis that is electrically orthogonal to the d-axis.

Note that, because contents of the current feedback control of the first MG 10 are basically the same as contents of the current feedback control of the second MG 20, a representative description will hereinafter be made on the current feedback control of the second MG 20.

Figure 3:
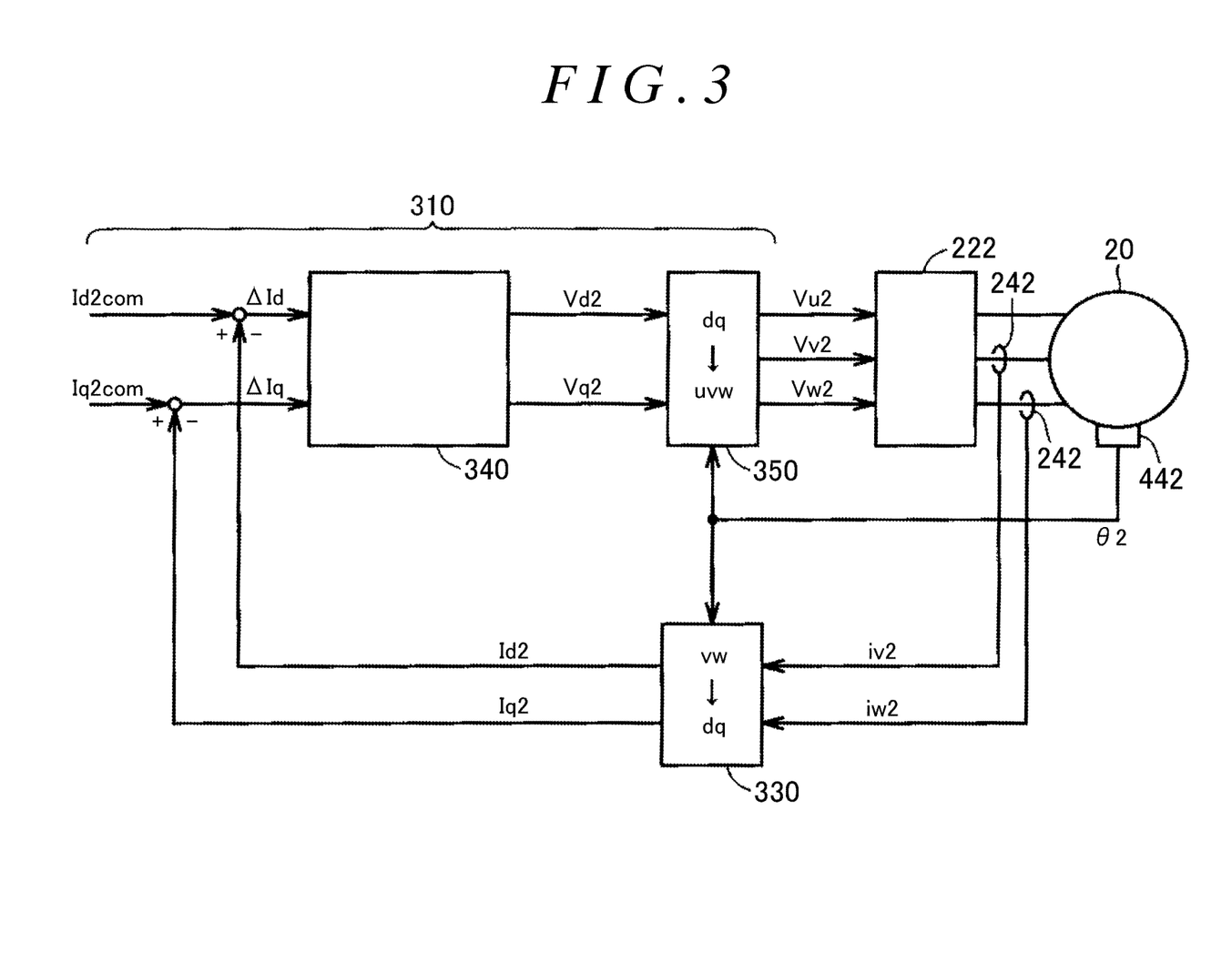
FIG. 3 is a functional block diagram of current feedback control.

FIG. 3 is a functional block diagram of the current feedback control of the second MG 20 by using the vector control method. The current feedback control of the second MG 20 is executed by an MG control section 310 included in the ECU 300. The MG control section 310 includes a coordinate conversion section 330, a voltage command generation section (a current control section) 340, and a coordinate conversion section 350.

The coordinate conversion section 330 uses the rotor rotational angle θ2 of the second MG 20, which is detected by the resolver 422, to convert the three-phase currents (iu2, iv2, iw2), which are detected by the current sensor 242, into a d-axis current Id2 and a q-axis current Iq2 (converts from the three phases of the U, V, and W phases to two phases of the d, q-axes).

The voltage command generation section 340 receives a deviation ΔId (ΔId=Id2com−Id2) between a d-axis current command value Id2com and the d-axis current Id2 of the second MG 20 and a deviation ΔIq (ΔIq=Iq2com−Iq2) between a q-axis current command value Iq2com and the q-axis current Iq2. Note that the d-axis current command value Id2com and the q-axis current command value Iq2com are determined on the basis of user requested power, for example, during a normal operation.

By executing PI (proportional integral) control or the like, the voltage command generation section 340 computes a d-axis voltage command value Vd2 for making the deviation ΔId approximate 0 and a q-axis voltage command value Vq2 for making the deviation ΔIq approximate 0.

The coordinate conversion section 350 receives the d-axis voltage command value Vd2 and the q-axis voltage command value Vq2. The coordinate conversion section 350 uses the rotor rotational angle θ2 of the second MG 20, which is detected by the resolver 422, to convert the d-axis voltage command value Vd2 and the q-axis voltage command value Vq2 to a U-phase voltage command Vu2, a V-phase voltage command Vv2, and a W-phase voltage command Vw2 (converts from the two phases of the d, q-axes to the three phases of the U, V, and W phases).

The coordinate conversion section 350 outputs phase voltage commands Vu2, Vv2, Vw2 to the second inverter 222. In this way, the switching elements Q9 to Q14 of the second inverter 222 are controlled such that the d-axis current Id2 and the q-axis current Iq2 of the second MG 20 respectively correspond to the d-axis current command value Id2com and the q-axis current command value Iq2com.

As described above, the output voltage of the battery 150 has a relatively high value (for example, about several hundred volts). A voltage that is equal to or higher than the battery voltage VB is applied to the paired electric power lines PL2, NL2 via the converter 210 in a state where the SMR 160 is closed and the battery 150 and the PCU 200 are connected. Thus, a large number of electric charges are stored in the capacitor C2, and the system voltage VH obtains a high value. For this reason, in the case where the vehicle 1 collides with the collision target, it is desired to open the SMR 160 and disconnect the battery 150 from the capacitor C2, so as to promptly discharge residual electric charges of the capacitor C2.

As a specific method for discharging the residual electric charges of the capacitor C2, it is considered to control the inverters 221, 222 such that the inverters 221, 222 each perform the switching operation so as to prevent a flow of the q-axis current (the torque current) but cause a flow of the d-axis current (the field current) into the MGs 10, 20. By using this method, the torque is not generated in the MGs 10, 20, and the residual electric charges of the capacitor C2 can be consumed in the form of heat generated in the MG coils (the first MG coil, the second MG coil) and the switching elements Q3 to Q14 of the inverters 221, 222. The control for discharging the residual electric charges of the capacitor C2 by performing the switching operations of the inverters 221, 222 so as to prevent the flow of the q-axis current but cause the flow of the d-axis current into the MGs 10, 20 will hereinafter also be referred to as "capacitor discharge control".

Then, in the case where discharge of the capacitor C2 is completed by the capacitor discharge control, it is desired to shut down the inverters 221, 222 (bring all of the switching elements into gate blockage states) so as to prevent unnecessary actuation of the inverters 221, 222.

However, in a state where the current is flowing through each of the MGs 10, 20 during the shutdown, the electric charges possibly are recirculated into the capacitor C2 immediately after the shutdown, and the system voltage VH is possibly boosted to be higher than expected. More specifically, in the case where the inverters 221, 222 are shut down in the state where the current is flowing through each of the MGs 10, 20 (that is, in a state where energy is stored in each of the MG coils), the large number of the electric charges may be instantaneously recirculated into the capacitor C2 from the MGs 10, 20 via the upper diodes of the inverters 221, 222 due to the energy stored in each of the MG coils at a moment of the shutdown, and the system voltage VH may boost more than expected.

Note that, as a situation where the current flows through each of the MGs 10, 20 during the shutdown, for example, a case where the inverters 221, 222 are shut down during rotation of the MGs 10, 20, or a case where the inverters 221, 222 are erroneously shut down in an early stage in a state where the d-axis current by the capacitor discharge control still flows through each of the MGs 10, 20, and the like can be expected.

In view of the above problem, the ECU 300 of this embodiment executes control (hereinafter referred to as "recirculation reduction control") for reducing an amount of the electric charges that are recirculated into the capacitor C2 during the shutdown by performing the switching operations of the inverters 221, 222 such that the current flowing through each of the MGs 10, 20 obtains a smaller value (e.g., 0) than the value thereof during the capacitor discharge control at a time that is after the capacitor discharge control is finished and before the inverters 221, 222 are shut down. Then, after executing the recirculation reduction control, the ECU 300 shuts down the inverters 221, 222. In this way, the recirculation amount of the electric charges recirculated into the capacitor C2 during the shutdown is reduced. Thus, it is possible to suppress the system voltage VH from boosting more than expected after the shutdown.

Note that a description will hereinafter be made on an example in which the current flowing through each of the MGs 10, 20 becomes zero by executing the recirculation reduction control.

Figure 4:
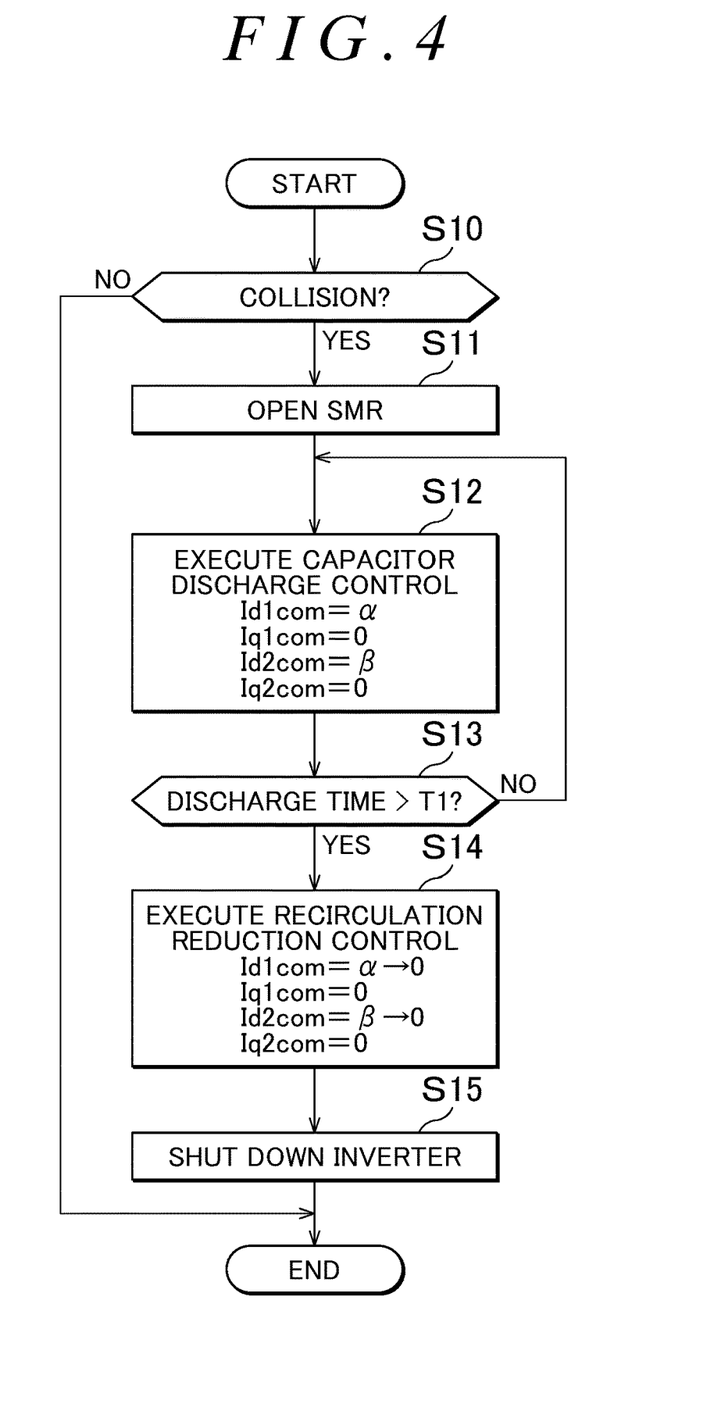
FIG. 4 is a flowchart (Example 1) of one example of a processing procedure by an ECU.

FIG. 4 is a flowchart of one example of a processing procedure that is executed by the ECU 300 during occurrence of a vehicle collision. In step (hereinafter step will be abbreviated as "S") 10, the ECU 300 determines whether the occurrence of the collision of the vehicle 1 is detected by the collision detection section 90. If the occurrence of the collision of the vehicle 1 is not detected (NO in S10), the ECU 300 terminates the processing.

If the occurrence of the collision of the vehicle 1 is detected (YES in S10), the ECU 300 opens the SMR 160 in S11. In this way, a flow of the electric charges from the battery 150 to the capacitor C2 is blocked.

In S12, the ECU 300 executes the above-described "capacitor discharge control". More specifically, the ECU 300 sets a d-axis current command value Id1com of the first MG 10 to be a specified value α (for example, minus 50 amperes) and sets a q-axis current command value Iq1com to be zero. Furthermore, the ECU 300 sets the d-axis current command value Id2com of the second MG 20 to be a specified value β (for example, a value equal to or smaller than the specified value α) and sets the q-axis current command value Iq2com to be zero. In this way, the torque is not generated in the MGs 10, 20, and the residual electric charges of the capacitor C2 can be consumed in the form of the heat generated in the MG coils and the inverters 221, 222.

In S13, the ECU 300 determines whether a discharge time of the capacitor discharge control exceeds a specified time T1 (for example, 1000 msec). This processing is executed to guarantee that the system voltage VH is reduced to be lower than a specified value (an amount of the residual electric charges of the capacitor C2 is reduced below a specified amount) by the capacitor discharge control. If the discharge time does not exceed the specified time T1 (NO in S13), the processing returns to S12, and the ECU 300 continues the capacitor discharge control.

If the discharge time exceeds the specified time T1 (YES in S13), the ECU 300 executes the above-described "recirculation reduction control" in S14. More specifically, the ECU 300 reduces the d-axis current command value Id1com of the first MG 10 from the specified value α to zero at a specified rate and maintains the q-axis current command value Iq1com at zero. Furthermore, the ECU 300 reduces the d-axis current command value Id2com of the second MG 20 from the specified value 1 to zero at the specified rate and maintains the q-axis current command value Iq1com at zero. In this way, the switching operation of each of the inverters 221, 222 is performed, so as to prevent the flow of the current through each of the MGs 10, 20 (that is, to reduce the current flowing through each of the MGs 10, 20 to be lower than that during the capacitor discharge control).

After executing the recirculation reduction control, the ECU 300 shuts down the inverters 221, 222 in S15. That is, the ECU 300 brings all of the switching elements Q3 to Q14 of the inverters 221, 222 into the gate blockage states.

Figure 5:
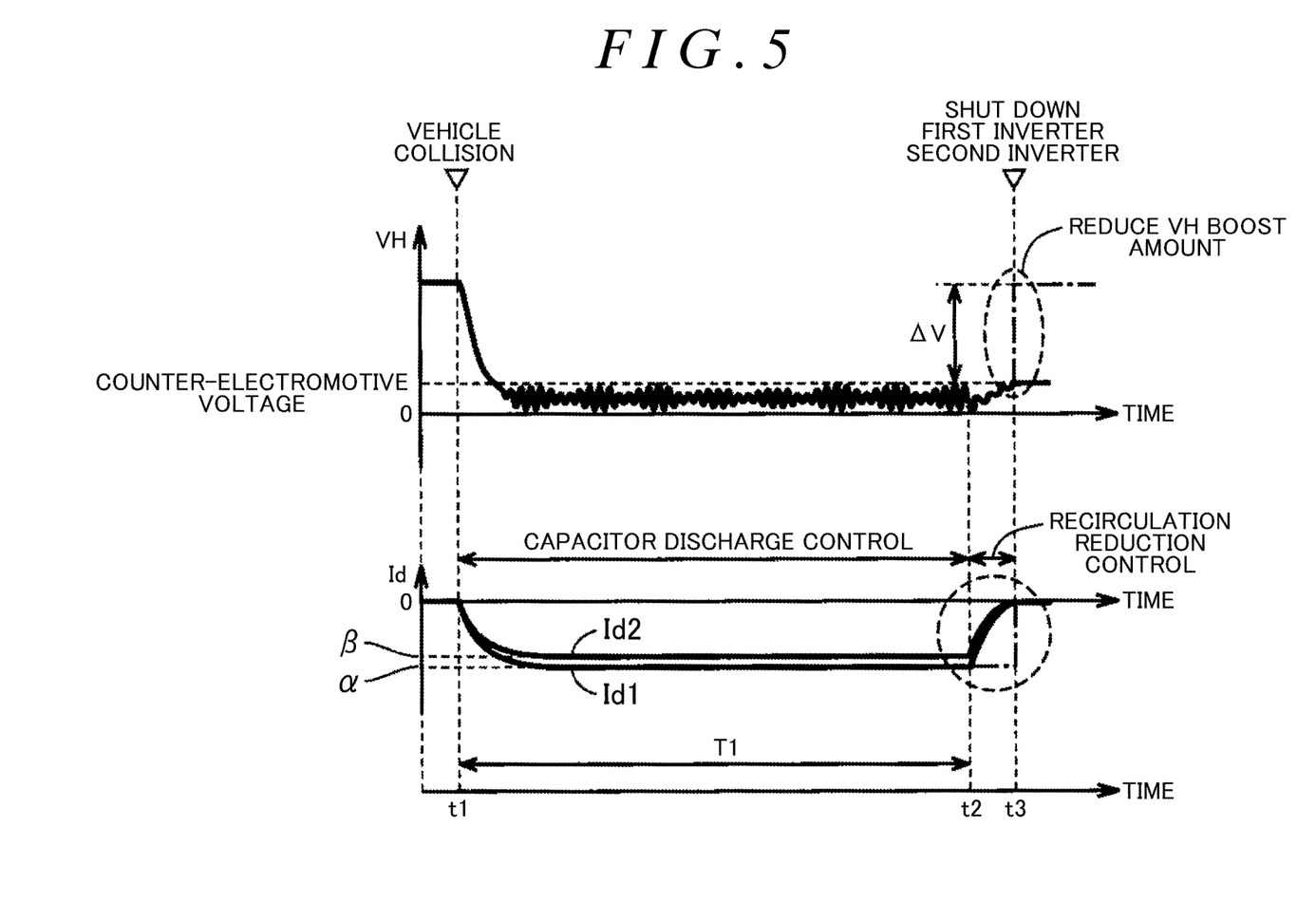
FIG. 5 is a chart (Example 1) of one example of changes in a system voltage VH and d-axis currents of MGs in the case where a vehicle collision occurs.

FIG. 5 is a chart of one example of changes in the system voltage VH and the d-axis currents of the MGs 10, 20 in the case where the vehicle collision occurs. Note that FIG. 5 shows a case where the MGs 10, 20 are currently rotating and a counter-electromotive voltages are generated in the MGs 10, 20.

When the vehicle 1 collides at time t1, the capacitor discharge control is started, and the d-axis currents Id1, Id2 of the MGs 10, 20 are respectively controlled to the specified values α, β. In this way, the residual electric charges of the capacitor C2 flows into the MGs 10, 20 and the inverters 221, 222 and are consumed in the form of heat. Thus, the system voltage VH is reduced. Note that, although not shown, the q-axis currents Iq1, Iq2 are zero after the time t1.

At time t2, at which the specified time T1 elapses from the time t1 at which the capacitor discharge control is started, the capacitor discharge control is stopped, and the recirculation reduction control is started. In the recirculation reduction control, the d-axis currents Id1, Id2 of the MGs 10, 20 are each reduced to 0 at the specified rate. As a result, the MGs 10, 20 are each brought into a state where the current does not flow therethrough.

Then, the inverters 221, 222 are shut down at time t3, at which the d-axis currents Id1, Id2 become 0. Because each of the MGs 10, 20 is in the state where the current does not flow therethrough (that is, a state where the energy is not stored in the MG coils) at this time point, the boost in the system voltage VH caused by the energy of the MG coils does not occur.

Note that the MGs 10, 20 are rotating and the counter-electromotive voltages are generated in the MGs 10, 20 in FIG. 5; therefore, the system voltage VH does not become 0 at the time t3 and obtains a value that corresponds to the counter-electromotive voltage. However, because the current does not flow through each of the MGs 10, 20 due to the recirculation reduction control, the system voltage VH is suppressed from increasing to a value that is higher than the counter-electromotive voltage. That is, if each of the inverters 221, 222 is shut down in the state where the current flows through each of the MGs 10, 20, a booster circuit is formed by the MG coils and the upper diodes of the inverters 221, 222. Thus, it is expected that the system voltage VH is increased to a value that is obtained by adding a boost amount ΔV caused by the energy of each of the MG coils (see a one-dot chain line) to the counter-electromotive voltage. However, in this embodiment, the boost amount ΔV caused by the energy of each of the MG coils can be suppressed. As a result, the boost amount of the system voltage VH after the shutdown can be reduced.

As it has been described so far, in the case where the vehicle 1 collides, the ECU 300 according to this embodiment executes the capacitor discharge control for discharging the residual electric charges of the capacitor C2 by performing the switching operations of the inverters 221, 222 so as to prevent the flow of the q-axis current but cause the flow of the d-axis current into the MGs 10, 20. Then, after the capacitor discharge control is finished, the ECU 300 does not shut down the inverters 221, 222 immediately but executes the recirculation reduction control for reducing the recirculation amount of the electric charges recirculated into the capacitor C2 during the shutdown by performing the switching operations of the inverters 221, 222 so as to make the current flowing through each of the MGs 10, 20 becomes zero (a value lower than that during the capacitor discharge control). After executing the recirculation reduction control, the ECU 300 shuts down the inverters 221, 222. In this way, the recirculation amount of the electric charges recirculated into the capacitor C2 during the shutdown is reduced. Thus, the system voltage VH is suppressed from boosting more than expected.

Furthermore, the ECU 300 according to this embodiment executes the recirculation reduction control by using the existing inverters 221, 222. Thus, compared to a case where a dedicated component for the recirculation reduction control is added, an increase in cost can be suppressed.

Moreover, the ECU 300 according to this embodiment operates all of the switching elements Q3 to Q14 of the inverters 221, 222 when executing the recirculation reduction control. Thus, the current is distributed to the switching elements Q3 to Q14. Thus, compared to a case where each of the inverters 221, 222 is brought into a three-phase on state in Modified Example 2, which will be described below, a concentrated flow of the current into some of the switching elements can be suppressed, and an increase in a temperature of each of the switching elements can be suppressed.

In the above-described embodiment, the case where the switching operations of the inverters 221, 222 are performed to make the current flowing through each of the MGs 10, 20 zero has been described as the example of the recirculation reduction control.

Meanwhile, in this Modified Example 1, a case will be described as another example of the recirculation reduction control. In this case, a total of the currents flowing through the first MG 10 and the second MG 20 is reduced by shutting down the first inverter 221 and the second inverter 222 at different timing. Note that an example in which the first inverter 221 and the second inverter 222 are shut down in this order will hereinafter be described; however, the order of shutting down may be reversed.

Figure 6:
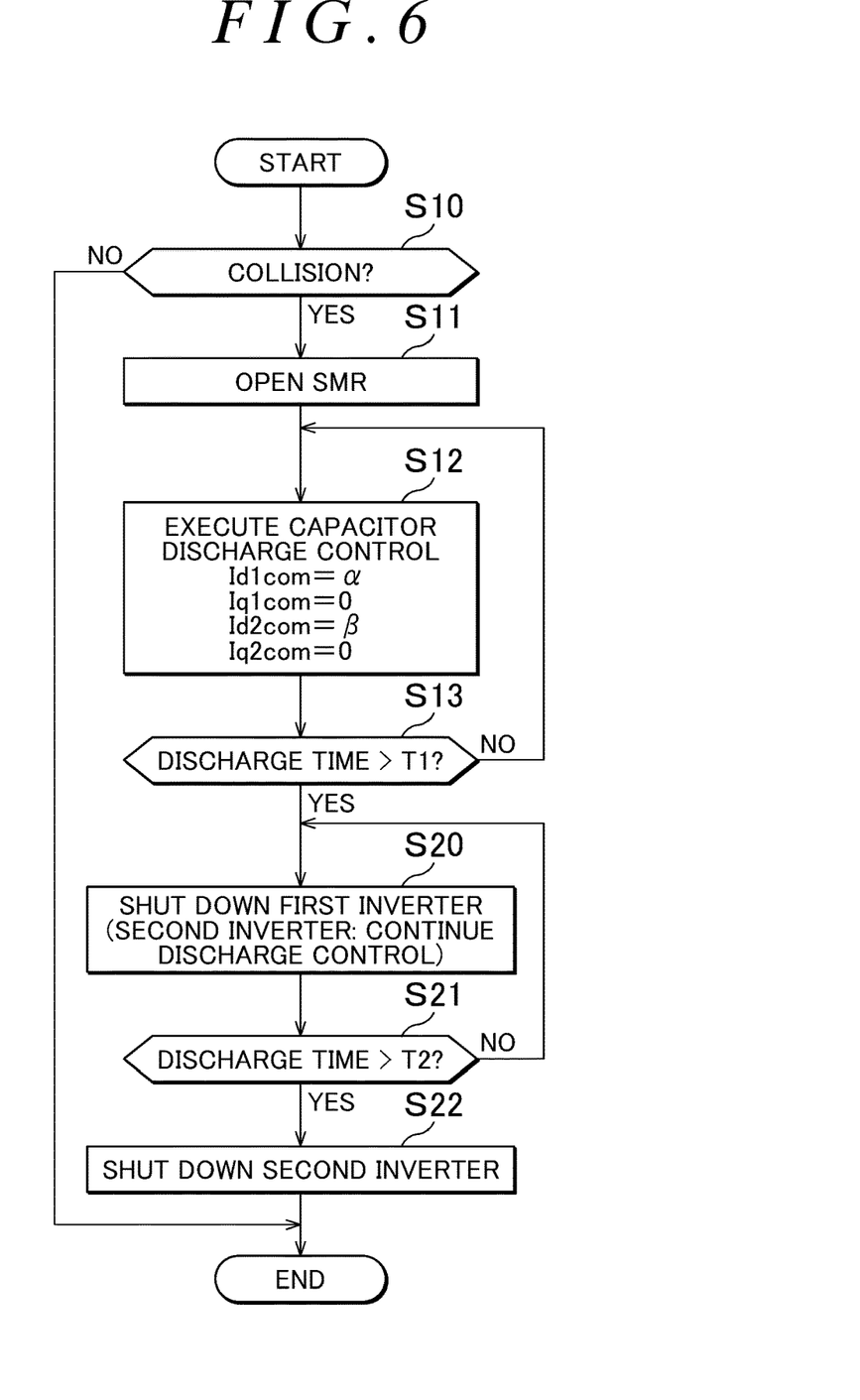
FIG. 6 is a flowchart (Example 2) of one example of the processing procedure by the ECU.

FIG. 6 is a flowchart of one example of a processing procedure that is executed by the ECU 300 during the occurrence of the vehicle collision according to this Modified Example 1. Note that, in the flowchart shown in FIG. 6, the processing of S14, S15 of the flowchart shown in FIG. 4 is replaced by S20 to S22. The other steps are the same as the steps shown in above-described FIG. 3, and have already been described. Thus, the detailed description thereon will not be repeated.

If the discharge time of the capacitor discharge control exceeds the specified time T1 (YES in S13), the ECU 300 first shuts down the first inverter 221 in S20 while continuing the switching operation of the second inverter 222 performed by the capacitor discharge control. That is, while respectively maintaining the d-axis current command value Id2com and the q-axis current command value Iq2com of the second MG 20 to the specified value and zero, the ECU 300 brings all of the switching elements Q3 to Q8 of the first inverter 221 into the gate blockage states. In this way, compared to the case where both of the first inverter 221 and the second inverter 222 are maintained in switching operation states by the capacitor discharge control, the total of the currents flowing through the first MG 10 and the second MG 20 can be reduced. Note that the d-axis current command value Id2com of the second MG 20, which is set in S20, may be a smaller value than the specified value β.

In S21, the ECU 300 determines whether the discharge time of the processing of S20 exceeds a specified time T2. If the discharge time does not exceed the specified time T2 (NO in S21), the processing returns to S20, and the ECU 300 continues the processing of S20.

If the discharge time exceeds the specified time T2 (YES in S21), the ECU 300 shuts down the second inverter 222 in S22. That is, the ECU 300 brings all of the switching elements Q9 to Q14 of the second inverter 222 into the gate blockage states.

Figure 7:
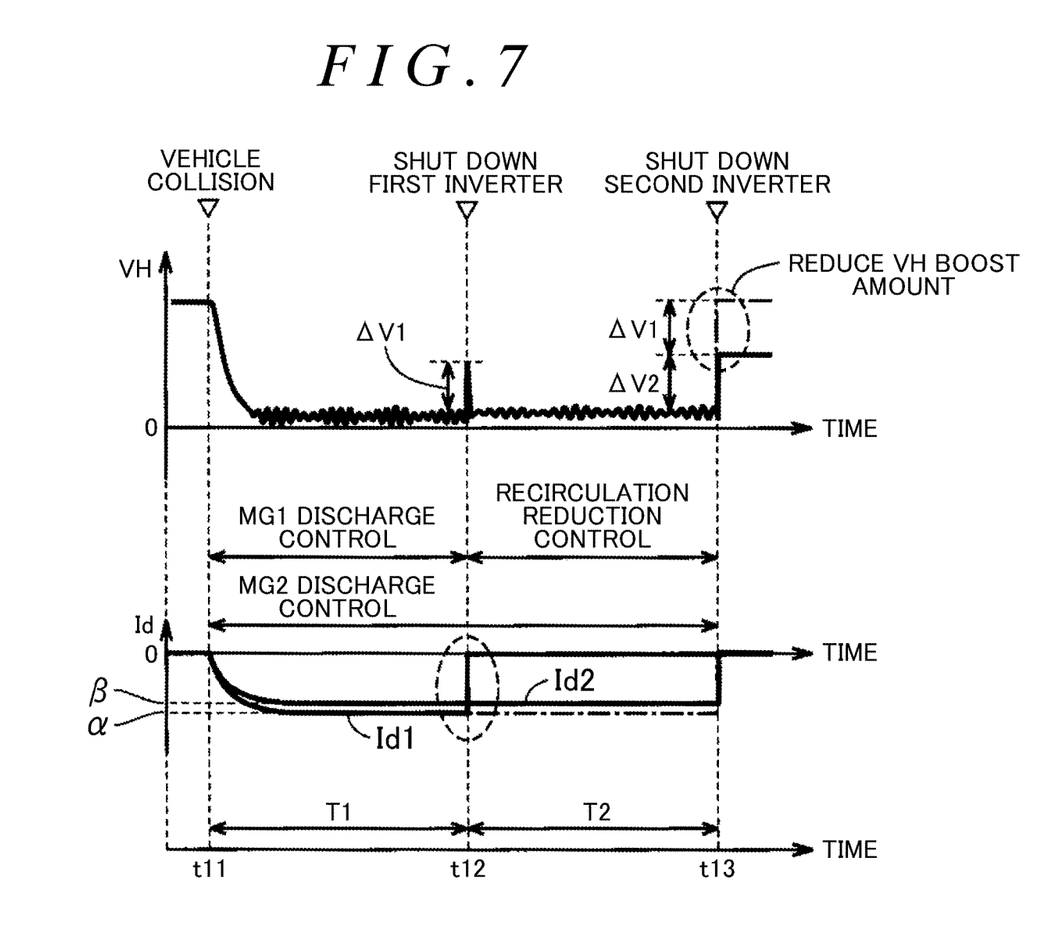
FIG. 7 is a chart (Example 2) of one example of the changes in the system voltage VH and the d-axis currents of the MGs in the case where the vehicle collision occurs.

FIG. 7 is a chart of one example of the changes in the system voltage VH and the d-axis currents of the MGs 10, 20 in the case where the vehicle collision occurs in this Modified Example. Note that FIG. 7 shows a case where the MGs 10, 20 are currently rotating.

When the vehicle 1 collides at time t11, the capacitor discharge control is started, and the d-axis currents Id1, Id2 of the MGs 10, 20 are respectively controlled to become the specified values α, β. In this way, the residual electric charges of the capacitor C2 flow into the MGs 10, 20 and the inverters 221, 222 and are consumed in the form of heat. Thus, the system voltage VH is reduced. Note that, although not shown, the q-axis currents Iq1, Iq2 are zero after the time t11.

At time t12, at which the specified time T1 elapses from the time t11 at which the capacitor discharge control is started, the first inverter 221 is shut down prior to the second inverter 222. When the first inverter 221 is shut down, the electric charges are recirculated from the first MG 10 into the capacitor C2 by the energy stored in the first MG coils. Due to this influence, the system voltage VH is instantaneously leaped by a specified value ΔV1 at the time t12. Meanwhile, because the d-axis current Id2 of the second MG 20 is maintained to the specified value β, the electric charges of the capacitor C2 are consumed in the form of heat by the second MG coils and the switching elements Q9 to Q14 of the second inverter 222. Thus, the system voltage VH is promptly reduced.

At time t13 at which the specified time T2 elapses from the shutdown of the first inverter 221, the second inverter 222 is also shut down. Once the second inverter 222 is shut down, the electric charges are recirculated from the second MG 20 into the capacitor C2 by the energy stored in the second MG coils. Due to this influence, the system voltage VH is boosted by a specified value ΔV2 at the time t13.

The first inverter 221 has already been shut down at the time t13. Thus, compared to a case where the first inverter 221 and the second inverter 222 are concurrently shut down at the time t13, the boost amount of the system voltage VH is suppressed. More specifically, if the first inverter 221 and the second inverter 222 are concurrently shut down at the time t13, the system voltage VH after the shutdown is boosted not only by the specified value ΔV2 (a boost amount by the energy stored in the second MG coils) but also by the specified value ΔV1 (a boost amount by the energy stored in the first MG coils) (see a one-dot chain line). However, the first inverter 221 is first shut down at the time t12 in this Modified Example 1. Thus, the boost in the system voltage VH by the specified value ΔV1 is suppressed at the time t13. As a result, compared to the case where the first inverter 221 and the second inverter 222 are concurrently shut down, the boost amount of the system voltage VH after the shutdown can be reduced without executing complicated control.

In the above-described embodiment, the case where the switching operations of the inverters 221, 222 are performed to make the current flowing through each of the MGs 10, 20 zero has been described as the example of the recirculation reduction control.

Meanwhile, in this Modified Example 2, a case will be described as yet another example of the recirculation reduction control. In this case, each of the inverters 221, 222 is brought into the three-phase on state.

Figure 8:
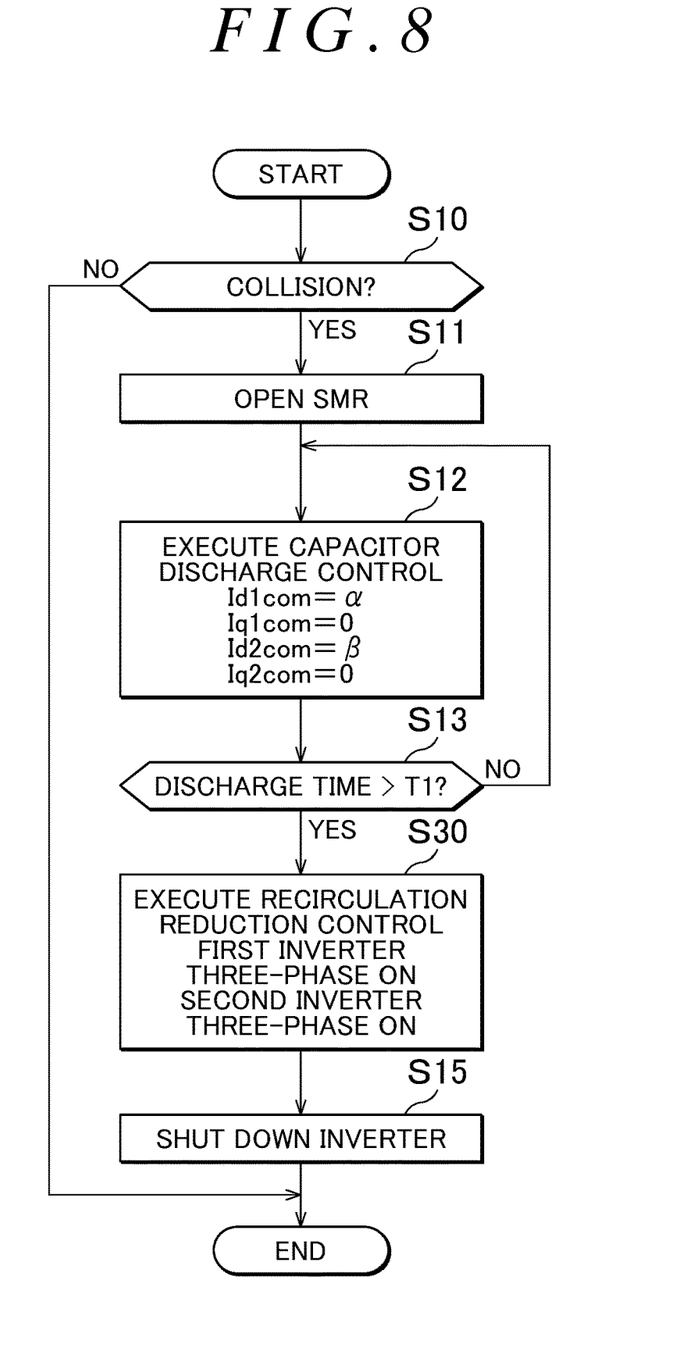
FIG. 8 is a flowchart (Example 3) of one example of the processing procedure by the ECU.

FIG. 8 is a flowchart of one example of the processing procedure that is executed by the ECU 300 during the occurrence of the vehicle collision according to this Modified Example 2. Note that, in the flowchart shown in FIG. 8, the processing of S14 of the flowchart shown in FIG. 4 is replaced by S30. The other steps are the same as the steps shown in above-described FIG. 3, and have already been described. Thus, the detailed description thereon will not be repeated.

If the discharge time of the capacitor discharge control exceeds the specified time T1 (YES in S13), the ECU 300 brings the first inverter 221 and the second inverter 222 into the three-phase on states in S30. The three-phase on state of the first inverter 221 is a state where the upper arms Q3, Q5, Q7 of all of the three phases of the first inverter 221 are maintained in on states (the conductive states) and the lower arms Q4, Q6, Q8 of all of the three phases thereof are maintained in off states (non-conductive state), or a state where the lower arms Q4, Q6, Q8 of all of the three phases thereof are maintained in the on states and the upper arms Q3, Q5, Q7 of all of the three phases thereof are maintained in the off states. Similarly, the three-phase on state of the second inverter 222 is a state where the upper arms Q9, Q11, Q13 of all of the three phases of the second inverter 222 are maintained in the on states and the lower arms Q10, Q12, Q14 of all of the three phases thereof are maintained in the off states, or a state where the lower arms Q10, Q12, Q14 of all of the three phases thereof are maintained in the on states and the upper arms Q9, Q11, Q13 of all of the three phases thereof are maintained in the off states.

In this way, a current circulation path is formed between the first MG 10 and the first inverter 221, and a current circulation path is also formed between the second MG 20 and the second inverter 222. Accordingly, the current is circulated between each of the MGs 10, 20 and each of the inverters 221, 222. Thus, the recirculation of the electric charges recirculated into the capacitor C2 is suppressed. As a result, the boost amount of the system voltage VH can be suppressed.

In the above-described embodiment, the vehicle that includes the two motor generators (the first MG 10, the second MG 20) is shown. However, the disclosure can also be applied to a vehicle that includes one motor generator.

In addition, in the above-described embodiment, the hybrid vehicle that includes the motor generators and the engine is shown. However, the disclosure can also be applied to an electric vehicle that does not include the engine.

In the above-described embodiment, the d-axis current flowing through each of the MGs 10, 20 is reduced to zero by the recirculation reduction control (the processing of S14 in FIG. 4). However, a magnitude of the d-axis current after a reduction by the recirculation reduction control only has to be a smaller value than the magnitude (an absolute value) of the d-axis current during the capacitor discharge control, and thus is not necessarily limited to zero.

For example, in the case where the value (the specified value α) of the d-axis current Id1 of the first MG 10 during the capacitor discharge control is set to minus 50 amperes, the magnitude of the d-axis current after the reduction by the recirculation reduction control may be the smaller value than the magnitude (the absolute value) of minus 50 amperes and thus may be minus 40 amperes or plus 40 amperes, for example. Also in this case, the total of the currents flowing through the first MG 10 and the second MG 20 is reduced from that during the capacitor discharge control. Thus, the recirculation amount of the electric charges recirculated into the capacitor C2 during the shutdown can be reduced.

In addition, instead of reducing the d-axis currents flowing through the MGs 10, 20, either one of the d-axis currents may only be reduced. Also in this case, the total of the currents flowing through the first MG 10 and the second MG 20 is reduced when compared with that during the capacitor discharge control. Thus, the recirculation amount of the electric charges recirculated into the capacitor C2 during the shutdown can be reduced.

In the above-described embodiment, if the discharge time of the capacitor discharge control exceeds the specified time T1, it is determined that the system voltage VH is reduced to be lower than the specified value in the processing of S13 in FIG. 4. That is, it may be determined that the system voltage VH is reduced to become lower.

However, in the case where the voltage sensor 232, which detects the system voltage VH, is normal after the vehicle collision, it may directly be determined whether the system voltage VH is reduced to be lower than the specified value in the processing of S13 in FIG. 4 according to the system voltage VH detected by the voltage sensor 232. That is, it may be determined that the system voltage VH is reduced to become lower.

In addition, the above-described embodiments and Modified Examples thereof can appropriately be combined within the scope that does not cause technical discrepancies.

It should be considered that the embodiment disclosed herein is illustrative in any respect and is not restrictive. Various modification may be made to the embodiment within the scope of the disclosure.

What is claimed is:
1. A vehicle comprising:
at least one permanent magnet type rotary electric machine;
an inverter that drives the rotary electric machine;
paired DC electric power lines connected to the inverter;
a capacitor connected between the paired DC electric power lines; and
a control unit that controls the inverter, wherein
the control unit: executes first control for discharging electric charges stored in the capacitor by performing a switching operation of the inverter so as to prevent a flow of a q-axis current but cause a flow of a d-axis current to the rotary electric machine in a case where a vehicle collision is detected;
stops the first control in a specified case and executes second control for performing the switching operation of the inverter, wherein the second control reduces an absolute value of the d-axis current flowing through the rotary electric machine to be lower than the absolute value of the d-axis current during execution of the first control; and
executes third control for switching the inverter into a gate blockage state after execution of the second control.

2. The vehicle according to claim 1, wherein the specified case is a case in which a voltage of the capacitor becomes lower.

3. The vehicle according to claim 1, wherein
the specified case is a case in which a voltage of the capacitor is lower than a specified value.

4. The vehicle according to claim 1, wherein
the specified case is a case in which a specified time elapses from a start of the first control.

5. A vehicle comprising:
a permanent magnet type first rotary electric machine;
a first inverter that drives the first rotary electric machine;
a permanent magnet type second rotary electric machine;
a second inverter that drives the second rotary electric machine;
paired DC electric power lines connected to the first inverter and the second inverter;
a capacitor connected between the paired DC electric power lines; and
a control unit that controls the first inverter and the second inverter, wherein
the control unit: executes first control for discharging electric charges stored in the capacitor by performing switching operations of the first inverter and the second inverter so as to prevent a flow of a q-axis current but cause a flow of a d-axis current to each of the first rotary electric machine and the second rotary electric machine in a case where a vehicle collision is detected;
stops the first control in a specified case and executes second control for controlling the first inverter and the second inverter, wherein the second control reduces a total of absolute values of the d-axis currents flowing through the first rotary electric machine and the second rotary electric machine to be lower than the total of absolute values of the d-axis currents during execution of the first control; and
executes third control for switching the first inverter and the second inverter into gate blockage states after execution of the second control.

6. The vehicle according to claim 5, wherein
the specified case is a case in which a voltage of the capacitor becomes lower.

7. The vehicle according to claim 5, wherein
the specified case is a case in which a voltage of the capacitor is lower than a specified value.

8. The vehicle according to claim 5, wherein
the specified case is a case in which a specified time elapses from a start of the first control.

9. The vehicle according to claim 5, wherein
the first control is control for performing the switching operations of the first inverter and the second inverter such that a magnitude of the q-axis current of each of the first rotary electric machine and the second rotary electric machine becomes zero, that the absolute value of the d-axis current of the first rotary electric machine becomes a first specified value that is larger than zero, and that the absolute value of the d-axis current of the second rotary electric machine becomes a second specified value that is larger than zero,
the second control is control for performing the switching operation of the first inverter such that the first inverter is brought into the gate blockage state, that the magnitude of the q-axis current of the second rotary electric machine becomes zero, and that the absolute value of the d-axis current of the second rotary electric machine becomes equal to or smaller than the second specified value, and
the third control is control for switching the second inverter into the gate blockage state while maintaining the first inverter in the gate blockage state after the execution of the second control.

10. The vehicle according to claim 5, wherein
the first control is control for performing the switching operations of the first inverter and the second inverter such that a magnitude of the q-axis current of each of the first rotary electric machine and the second rotary electric machine becomes zero, that the absolute value of the d-axis current of the first rotary electric machine becomes a first specified value that is larger than zero, and that the absolute value of the d-axis current of the second rotary electric machine becomes a second specified value that is larger than zero,
the second control is control for performing the switching operations of the first inverter and the second inverter such that the absolute value of the d-axis current of the first rotary electric machine becomes equal to or smaller than the first specified value and that the absolute value of the d-axis current of the second rotary electric machine becomes equal to or smaller than the second specified value, and
the third control is control for switching the first inverter and the second inverter into the gate blockage states after the execution of the second control.

11. The vehicle according to claim 5, wherein
the second control is control for performing the switching operation of either one of the first inverter and the second inverter so as to reduce the absolute value of the d-axis current of either one of the first rotary electric machine and the second rotary electric machine.

12. The vehicle according to claim 5, wherein
the second control is control for bringing the first inverter and the second inverter into three-phase on states.

13. The vehicle according to claim 5, further comprising:
a sensor that detects a voltage of the capacitor, wherein
the control unit determines whether the voltage of the capacitor, which is detected by the sensor, is reduced to be lower than a specified value, and executes the second control in a case where the voltage of the capacitor, which is detected by the sensor, is reduced to be lower than the specified value.

* * * * *

UNITED STATES PATENT AND TRADEMARK OFFICE
CERTIFICATE OF CORRECTION

PATENT NO. : 10,086,706 B2
APPLICATION NO. : 15/456776
DATED : October 2, 2018
INVENTOR(S) : Atsushi Nomura Page 1 of 1

It is certified that error appears in the above-identified patent and that said Letters Patent is hereby corrected as shown below:

In the Specification

In Column 9, Line 65, delete "specified value 1" and insert --specified value β--, therefor.

In Column 11, Line 58, delete "specified value" and insert --specified value β--, therefor.

Signed and Sealed this
Thirteenth Day of November, 2018

Andrei Iancu
*Director of the United States Patent and Trademark Office*